(12) United States Patent
Hansen et al.

(10) Patent No.: US 6,606,572 B2
(45) Date of Patent: Aug. 12, 2003

(54) CIRCUIT ARRANGEMENT FOR DERIVING THE MEASURED VARIABLE FROM THE SIGNALS OF SENSORS OF A FLOW METER

(75) Inventors: Henning Max Hansen, Sønderborg (DK); Frands Wulff Voss, Sønderborg (DK); Niels Per Mondrup, Augustenborg (DK); Karsten Westermann, Sønderborg (DK); Hans Jørgen Moos, Nordborg (DK); James D. Collier, Ely (GB); Roger F. Sewell, Cambs (GB); Richard-Jan E. Jansen, HK Leiden (NL)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/156,459

(22) Filed: May 28, 2002

(65) Prior Publication Data

US 2003/0033096 A1 Feb. 13, 2003

Related U.S. Application Data

(63) Continuation-in-part of application No. 09/381,568, filed as application No. PCT/DK98/00130 on Mar. 30, 1998, now abandoned.

(30) Foreign Application Priority Data

Apr. 3, 1997 (DE) .......................... 197 13 786

(51) Int. Cl.[7] .............................. G06F 19/00
(52) U.S. Cl. ..................................... 702/45
(58) Field of Search ....... 73/861.353, 861.354–861.357; 324/76.52, 76.55; 702/45, 71, 72

(56) References Cited

U.S. PATENT DOCUMENTS

| | | | | |
|---|---|---|---|---|
| 5,024,104 A | * | 6/1991 | Dames ................. | 73/861.357 |
| 5,844,408 A | * | 12/1998 | Yoshimura et al. ...... | 324/76.52 |
| 5,907,104 A | * | 5/1999 | Cage et al. ............ | 73/861.355 |

* cited by examiner

Primary Examiner—Kamini Shah
(74) Attorney, Agent, or Firm—Barnes & Thornburg

(57) ABSTRACT

In a circuit arrangement for deriving the measured variable from the signals ($S_1$ to $S_2$) of at least two sensors (23, 24) of a flow meter, which flow meter comprises one or several parallel fluid lines (20, 21) and means (22) for exciting oscillations of a predetermined fundamental frequency ($\omega$) in the fluid line(s), the sensors (23, 24) detect the oscillations and the sensor signals ($S_1$ to $S_2$) are supplied by way of a respective A-D converter (36; 37) to a digital processing unit (P) having a computation circuit (46), in which their phase difference ($\Phi$) is determined as a measure of the flow. In order to be largely independent of unwanted changes in the fundamental frequency ($\omega$) of the sensor signals ($S_1$, $S_2$), and to measure the flow with little effort and with as few errors as possible, provision is made for the processing unit (P) between the A-D converter (36; 37) of each sensor signal ($S_1$, $S_2$) and the computation circuit (46) to comprise a digital multiplier circuit (M) and a digital filter arrangement (F) downstream thereof, for the digital sensor signals ($S_1$, $S_2$) to be multiplied in the multiplier circuit (M) with respective digital signals (I, R) phase-displaced by 90° with respect to one another that represent sinusoidal oscillations of identical maximum amplitude (x) and of a frequency ($\omega + \Delta\omega$) that varies by a slight difference frequency ($\Delta\omega$) from the fundamental frequency ($\omega$), and for the pass band of the filter arrangement (F) to be matched to the difference frequency ($\Delta\omega$).

19 Claims, 3 Drawing Sheets

CIRCUIT ARRANGEMENT FOR DERIVING THE MEASURED VARIABLE FROM THE SIGNALS OF SENSORS OF A FLOW METER

RELATED APPLICATION

This application is a continuation-in-part of U.S. patent application Ser. No. 09/381,568, filed Jan. 10, 2000 now abandoned, which is the national filing of international application number PCT/DK98/00130 filed Mar. 30, 1998.

BACKGROUND OF THE INVENTION

The invention relates to a circuit arrangement for deriving the measured variable from the signals of at least two sensors of a flow meter, which flow meter comprises a fluid line or several parallel fluid lines and means for exciting oscillations of a predetermined fundamental frequency in the fluid line(s), the sensors detecting the oscillations and the sensor signals being supplied by way of a respective A-D converter to a digital processing unit having a computation circuit in which their phase difference is determined as a measure of the flow.

DE 43 19 344 C2 discloses a method of measuring the phase difference in a Coriolis mass flow meter. In this case, sensor signals representing physical variables of the flow, the phase difference of which signals is to be determined as a measure of the flow, are transmitted by way of amplifiers, analogue low-pass filters and analogue-to-digital converters to a processing unit, in which the phase difference is calculated.

U.S. Pat. No. 5,555,190 discloses a circuit arrangement of the kind mentioned initially for a Coriolis flow meter in which two tubes are caused to oscillate in anti-phase. The oscillations are measured by sensors at different points of the tubes, the phase difference between the sensor signals being used as a measure of the flow. For that purpose, the circuit arrangement contains two channels, in each of which there is arranged an analogue-to-digital converter having downstream thereof a so-called "decimator", wherein the signals are subsequently passed through a digital rejection filter which allows all interference signals through apart from in a narrow stop frequency band around the fundamental frequency. This digitally filtered signal is subtracted from the original signal, in order to obtain a more accurate representation of the sensor signals. The stop frequency band of the filter is adjustable, the filter being controlled in accordance with an algorithm in such a way that it follows the changes in the fundamental frequency.

This method is suitable for measuring very small phase differences that occur in a Coriolis flow meter. The fundamental frequency of a flow meter is not constant, however. It is supposed to be changed in dependence on changes in the material properties of the tube and in the density of the fluid flowing through the flow meter. When the fundamental frequency is changed, the constants of the filter also have to be changed, in order to match the filter to the fundamental frequency. Changing of the filter constants produces a change in the output signal of the filter. A sudden change causes disturbance that falsifies the measurement signal. Only when the quiescent state has been reached, after matching to the fundamental frequency, do the measurements become reliable. In the interim period, they are seriously distorted and useless, and the measured flow is error-prone. That is why this method is not suitable for flow meters in which the fundamental frequency changes during operation.

U.S. Pat. No. 5,142,286 discloses an X-ray scintillator which has sigma-to-delta converters, downstream of which a so-called Hogenauer decimator is connected. The sigma-to-delta converters convert the analogue input signal at a high over-sampling frequency into a high-frequency digital signal. The downstream Hogenauer decimator scales down the sampling frequency of its input signal and suppresses high-frequency interference signals which occur during digitization.

From EP 0 282 552 it is known to extract phase difference between two sinusoidal signals by sampling a fixed number of times per cycle, multiply the samples with corresponding sine and cosine values and add the results for one whole cycle. The results represent the real and imaginary parts of the signal, and the tangent to the phase angle can be found by dividing the imaginary part with the real part. This method requires however, that the sampling is synchronized to multiples of the sensor frequency and it requires analog circuitry to change the clock frequency.

SUMMARY OF THE INVENTION

The invention is based on the problem of providing a circuit arrangement of the kind mentioned in the preamble, which allows a more accurate detection of the flow regardless of changes in the fundamental frequency, combined with a simple construction.

In accordance with the invention, that problem is solved in that the processing unit between the A-D converter of each sensor signal and the computation circuit comprises a digital multiplier circuit and a digital filter arrangement downstream thereof, the digital sensor signals are multiplied in the multiplier circuit with respective digital signals phase-displaced by 90° with respect to one another that represent sinusoidal oscillations of identical amplitude and a frequency that varies by a slight difference frequency from the fundamental frequency, and the pass band of the filter arrangement is matched to the difference frequency. A clock independent of the sensor frequency controls the sampling rate and subsequent down-sampled calculations. This eliminates the need for analog circuitry to synchronize the sampling to a multiple of the sensor frequency.

This construction of the circuit arrangement enables the flow to be accurately calculated from the sensor signals of the flow meter without a change in the fundamental frequency falsifying the measurement result. The parameters of the filter arrangement can remain constant even when the fundamental frequency changes, provided that the pass band corresponds to the maximum possible difference frequency. Owing to the fact that multiplication is effected with approximately the same frequency, the difference frequency is very much lower than the original frequency. This simplifies construction. The circuit arrangement is suitable both for mass flow meters and for electromagnetic flow meters and other flow meters in which the measured value is derived from the phase angle and amplitudes of two sinusoidal signals.

The filter arrangement can comprise band-pass filters for the product signals resulting from the multiplication. Preferably, however, it comprises low-pass filters, which are connected downstream of a respective multiplying element of the multiplier circuit.

The A-D converter preferably contains a sigma-to-delta converter and a decimator connected downstream thereof. This enables the analogue sensor signals to be converted with a simple construction at very high sampling frequency and with little digitizing noise, whilst simultaneously reducing the repetition rate of the binary values produced in digitization, for matching to a lower clock rate of the computation circuit whilst maintaining the high measurement accuracy.

The decimators can comprise a Hogenauer circuit having a first matrix of digital integrators, followed by a corresponding second matrix of digital differentiating elements. This circuit enables the frequency of the bit sequence from the sigma-to-delta converter to be reduced. Here, a multiple integration of the serial bit sequence is followed by a corresponding multiple differentiation with simultaneous frequency division into lower-frequency parallel bit sequences.

In detail, it is possible for the first matrix to consist of m columns and n rows of integrators, each of which comprises an adder having a first and a second summing input, a carry input, a summation output and a carry output, the summation outputs being connected in each case to the first summing input of a following adder of the same row and the carry outputs of the adders of the same columns being connected in each case to the carry input of the adder of the next-higher bit position, and each integrator comprising a flip-flop having a data input and at least one output, the signal being transferred from the data input to the output of the flip-flop when a clock pulse at a clock input of the flip-flop changes value, and the summation output of the adder of the relevant integrator being connected to the data input, and the output of the flip-flop being connected to the second summing input of the adder of the same integrator. In this connection, the entire first matrix can be constructed from comparatively few, simple gates (logic elements). All gates can be in the form of integrated circuits on a single chip, since multipliers and memory space for filter coefficients are not required. The integrator matrix can nevertheless operate at very high speed.

The second matrix can consist of m columns and n rows of differentiating elements, each of which comprises an adder having two summing inputs, a carry input, a summation output and a carry output, the summation outputs being connected to a respective first summing input of a following adder of the same row and the carry outputs of the adders of the same columns being connected to the respective carry input of the adder of the next-higher bit position, and each differentiating element comprising a flip-flop having a data input and at least one output, the signal being transferred inverted from the data input to the output of the flip-flop when a clock pulse at a clock input of the flip-flop changes value, the data input of the flip-flop being connected to the first summing input of the adder of the relevant differentiating element and the output of the flip-flop being connected to the second summing input of the adder of the same differentiating element. This construction allows the differentiating matrix to be constructed from adders that operate by using the inverse outputs of the flip-flops and allocating a binary 1 as subtractor to the carry inputs of the adders of the lowest position. The differentiating matrix can therefore also be constructed from simple gates without multipliers and memory space for coefficients. In addition, they can advantageously be formed on the same chip as the integrator matrix.

It is preferably arranged that, in the first column of the first matrix, the first summing inputs of the adders, except for the adder of the lowest bit position, are connected to a common input for a serial bit sequence. The least-significant bit is always 1, since the serial bit sequence from the sigma-to-delta converter is taken to be +1 or −1. The higher-order bits supplied to the connected inputs of the higher-order adders have a sign prefix. Although three series-connected integrators produce a carry, this is not important when the adders operate for a subtraction with the two's complement to 1 and there are sufficient bits to represent the largest number occurring at the output.

Parallel bit patterns for +1 and −1 can be supplied to the inputs of the decimator in dependence on the instantaneous value for the serial bit sequence, −1 being entered as the two's complement to 1. Thus, only two values are entered, which represent the instantaneous logical output value of the sigma-to-delta converter. This value is entered in parallel, however, and during subsequent integration and differentiation the bit pattern is processed without loss of information.

The first input of the lowest placed adder is preferably allocated a binary 1. In this way, +1 and the two's complement can be formed by an inversion of the serial bit sequence and by supplying the inverted bit sequence to the first input of the adder of the next-higher position of a column. +1 and −1 are in this instance formed in a very simple manner.

In the lowest placed row of the first matrix, the carry inputs of the adders are allocated a binary 0.

In the lowest placed row of the second matrix, the carry inputs of the adders are allocated a binary 1. Thus, a 1 is added to the inverted output signal of the adders by using the inverse outputs of the flip-flops, which represent the one's complement, so that the signal that is returned from the flip-flops to the second input of the adders represents the two's complement, so that the adders operate as subtractors.

The first matrix can operate at a high clock rate, whereas the second matrix operates at a lower clock rate. The serial high-frequency bit sequence thus becomes a parallel low-frequency bit sequence. The subsequent signal-processing can then be performed by a microprocessor.

Instead of constructing the differentiating elements of the second matrix as separate components, it is alternatively possible to realize the second matrix as a microprocessor, which is programmed to execute the differentiations following the integration. This has the advantage that the signal frequency after integration of the digitized signal is reduced, so that a fast microprocessor can now operate in real time, yet still be of simple and inexpensive construction.

The parameters of the filter arrangement are preferably variable in dependence on the application of the flow meter. In this way, all signals formed by the multiplication of the sum frequency can be filtered out, so that only signals of the difference frequency remain.

The computation circuit can determine the phase difference of the sensor signals in a simple manner according to the relation $$\varphi = \arctan\frac{bc - ad}{ac + bd}$$

in which a and b are the output signals of the filter arrangement after multiplication of the one sensor signal and c and d are the output signals of the filter arrangement after multiplication of the other sensor signal.

BRIEF DESCRIPTION OF THE DRAWINGS

The invention is explained hereinafter in greater detail with reference to the accompanying drawings of exemplary embodiments, in which.

DESCRIPTION OF THE PREFERRED EMBODIMENTS

Figure 1:
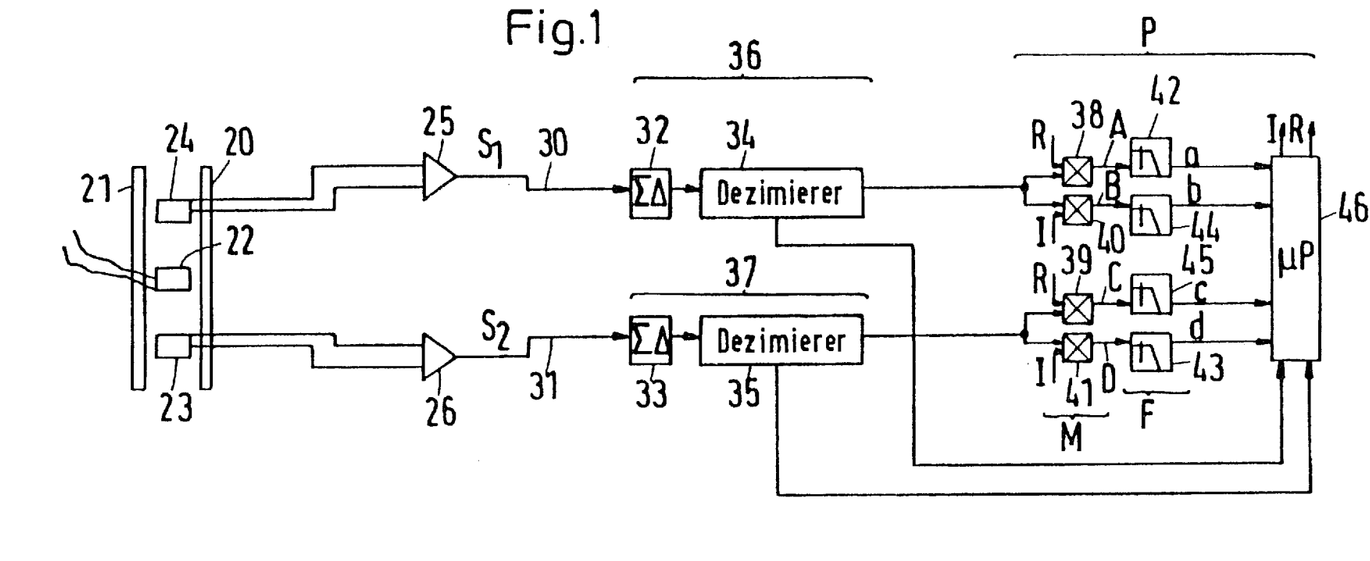
FIG. 1 is a block circuit diagram of an exemplary embodiment of the circuit arrangement of a mass flow meter in accordance with the invention.

The mass flow meter according to FIG. 1 has two measuring tubes 20, 21 which are caused to oscillate in antiphase by an actuator 22. The difference in amplitude of the oscillations of the two tubes 20, 21 is measured by two sensors 23 and 24 arranged at different points between the tubes 20, 21. The sensor signals are supplied by way of measurement lines to amplifiers 25 and 26, which at the same time provide high impedance matching.

The amplified sensor signals $S_1$ and $S_2$ are supplied by way of signal lines 30, 31 to a respective sigma-to-delta converter 32, 33 in analogue-to-digital converters 36, 37. The A/D converters are clocked by a fixed clock Cp1 (shown in FIGS. 2, 4 and 5) having a rate of 1 MHz. From the sigma-to-delta converters 32, 33 the digitized sensor signals at sample rate one mega samples pr sec are supplied to a respective Hogenauer decimator 34, 35 in the analogue-to-digital converters 36, 37. The downsampled digitized sensor signals at sample rate 678,5625 samples pr second are then multiplied with similarly digitized signals I and R in multipliers 38, 39, 40, and 41 of a multiplier circuit M. The signals I and R have approximately the same frequency as the sensor signals $S_1$ and $S_2$, and are phase-displaced by 90° relative to one another. On each of the multiplications, sum and difference frequency signals are obtained, of which the sum frequency signals are filtered out by downstream digital low-pass filters 42, 43, 44, 45 of a filter arrangement F. The low-frequency signals a, b, c and d allowed through by the low-pass filters are mutually out-of-phase sinusoidal signals in digital form, which correspond to the original sensor signals, but of a very much lower frequency. The actual flow values are then calculated from the signals a to d in a computation circuit 46 in the form of a microprocessor, which also generates the signals I and R in dependence on the digital sensor signals appearing in the decimators.

The mathematical derivation of the phase difference or phase shift $\Phi$ between the sensor signals $S_1$ and $S_2$ will be considered in the following.

Assuming a sinusoidal characteristic for the sensor signals, then these can be represented as follows $$S_1 = g \cdot \sin(\omega t) \qquad [1]$$

$$S_2 = h \cdot \sin(\omega t + \Phi) \qquad [2]$$

g and h being the respective amplitudes and $\omega$ being the fundamental frequency of the sensor signals and t being the time variable. Let the sensor signal $S_2$ be shifted out of phase with respect to the sensor signal $S_1$ by the phase difference $\Phi$.

The output signals I and R of the computation circuit 46 is represented by a sequence of numbers at a rate of 678,5625 numbers per second and the values are phase-displaced by 90° each and having the same amplitude x and approximately the same frequency $\omega$ as the sensor signals, but vary from this frequency by a slight amount $\Delta\omega$. For the signals I and R the following equations can therefore be declared.

$$I = x \cdot \sin(\omega t + \Delta\omega t) \qquad [3]$$

$$R = x \cdot \cos(\omega t + \Delta\omega t) \qquad [4]$$

According to the general trigonometric relation $$\sin\alpha \cdot \cos\beta = \frac{1}{2}\sin(\alpha + \beta) + \frac{1}{2}\sin(\alpha - \beta) \qquad [5]$$

the following equations are then true for the output signal A of the multiplier 38

$$A = S_1 \cdot R = g \cdot \sin(\omega t) \cdot x \cdot \cos(\omega t + \Delta\omega t) \qquad [6]$$

$$A = \frac{1}{2} g \cdot x \cdot \sin(2\omega t + \Delta\omega t) + \frac{1}{2} g \cdot x \cdot \sin(-\Delta\omega t) \qquad [7]$$

In the low-pass filter 42 the component of the signal A having the sum frequency is suppressed, so that the following relation is true for the output signal of the low-pass filter 42:

$$a = -\frac{1}{2} g \cdot x \cdot \sin(\Delta\omega t) \qquad [8]$$

With the equations [1] and [3] the following relation is true for the output signal B of the multiplier 40:

$$B = S_1 \cdot I = g \cdot \sin(\omega t) \cdot x \cdot \sin(\omega t + \Delta\omega t) \qquad [9]$$

According to the general trigonometric relation $$\sin\alpha \cdot \sin\beta = \frac{1}{2}\cos(\alpha - \beta) - \frac{1}{2}\cos(\alpha + \beta) \qquad [10]$$

the following is then true $$B = \frac{1}{2} g \cdot x \cdot \cos(-\Delta\omega t) - \frac{1}{2} g \cdot x \cdot \cos(2\omega t + \Delta\omega t) \qquad [11]$$

In the low-pass filter 44 the component of the signal B having the higher frequency is then again suppressed so that $$b = \frac{1}{2} g \cdot x \cdot \cos(\Delta\omega t) \qquad [12]$$

is allowed through as output signal.

The following relations then apply analogously for the output signals D and C of the multipliers 41 and 39 and the corresponding output signals d and c of the low-pass filters 43 and 45:

$$D = S_2 \cdot I = h \cdot \sin(\omega t + \Phi) \cdot x \cdot \sin(\omega t + \Delta\omega t) \qquad [13]$$

$$D = \frac{1}{2} h \cdot x \cdot \cos(\varphi - \Delta\omega t) - \frac{1}{2} \cdot h \cdot x \cdot \cos(2\omega t + \varphi + \Delta\omega t) \qquad [14]$$

$$d = \frac{1}{2} h \cdot x \cdot \cos(\varphi - \Delta\omega t) \qquad [15]$$

$$C = S_2 \cdot R = h \cdot \sin(\omega t + \Phi) \cdot x \cdot \cos(\omega t + \Delta\omega t) \qquad [16]$$

$$C = \frac{1}{2} h \cdot x \cdot \sin(2\omega t + \varphi + \Delta\omega t) + \frac{1}{2} h \cdot x \cdot \sin(\varphi - \Delta\omega t) \qquad [17]$$

$$c = \frac{1}{2} h \cdot x \cdot \sin(\varphi - \Delta\omega t) \qquad [18]$$

If the quotients of the output signals a and b on the one hand and c and d on the other hand are then formed, the following relations are obtained:

$$\frac{a}{b} = -\tan(\Delta\omega t) \qquad [19]$$

$$\frac{c}{d} = -\tan(\Delta\omega t - \varphi) \qquad [20]$$

If the inverse functions of the equations [19] and [20] are formed, one obtains, respectively:

$$\Delta\omega t = \arctan\left(-\frac{a}{b}\right) \qquad [21]$$

$$\Delta\omega t - \varphi = \arctan\left(-\frac{c}{d}\right) \qquad [22]$$

and thus, by subtraction of the equations [21] and [22], $$\varphi = \arctan\left(-\frac{a}{b}\right) - \arctan\left(-\frac{c}{d}\right) \qquad [23]$$

and according to the general trigonometric relation $$\arctan y - \arctan z = \arctan\frac{y-z}{1+yz} \qquad [24]$$

for the phase difference $$\varphi = \arctan\frac{bc - ad}{ac + bd} \qquad [25]$$

The phase difference Φ is a measure of the mass flow, which can be indicated digitally on a display after a corresponding calibration.

Figure 2:
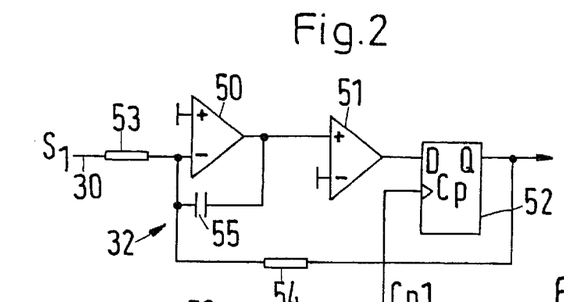
FIGS. 2 and 3 show two embodiments of a sigma-to-delta converter contained in the circuit arrangement according to FIG. 1.

FIG. 2 illustrates an exemplary embodiment of the sigma-to-delta converter 32 in the form of a first-order sigma-to-delta converter. The sigma-to-delta converter 33 can be of similar construction.

The sigma-to-delta converter 32 according to FIG. 2 contains an integrator, which is in the form of a so-called Miller integrator having an operational amplifier 50, an ohmic input resistance 53, which is connected to the inverting input of the operational amplifier 50, and a capacitor 55 between the inverting input and the output of the operational amplifier 50. The non-inverting input of the operational amplifier 50 is at ground potential. The output of the operational amplifier 50 is connected to the non-inverting input of a downstream operational amplifier 51, the inverting input of which is likewise at ground potential. The operational amplifier 51 is in the form of a Schmitt trigger or bistable comparator, the threshold value of which corresponds to ground potential. The binary output signal of the operational amplifier 51 is supplied to the data input D of a flip-flop 52, a so-called D-type flip-flop, the "true" or non-inverting output Q of which is connected firstly to the inverting input of the operational amplifier 51 and secondly to the input of the downstream Hogenauer decimator 34 by way of a resistance 54. Each bit of the serial bit sequence at the output of the comparator 51 is clocked by a clock pulse Cp1 of a clock pulse generator, not illustrated, into the flip-flop 52, the clock frequency at 1 MHz being very much higher than the maximum frequency of the analogue sensor signal $S_1$. In other words, the sigma-to-delta converter 32 effects an over-sampling of the analogue sensor signal $S_1$.

The serial bit sequence for the phase difference appearing at the output Q of the flip-flop 52 is returned to the inverting input of the operational amplifier 50 and is there superimposed on the sensor signal $S_1$.

The sigma-to-delta converter 32 according to FIG. 2 can be taken as an I-control loop, which by virtue of the comparator 51 has a high loop gain, so that interference signals coupled into this loop, especially digitization noise occurring as a result of digitization, are also largely compensated for. The sigma-to-delta converter therefore produces a digital output variable which corresponds very accurately and largely without error to the value of the sensor signal $S_1$. Construction is nevertheless very simple.

Figure 3:
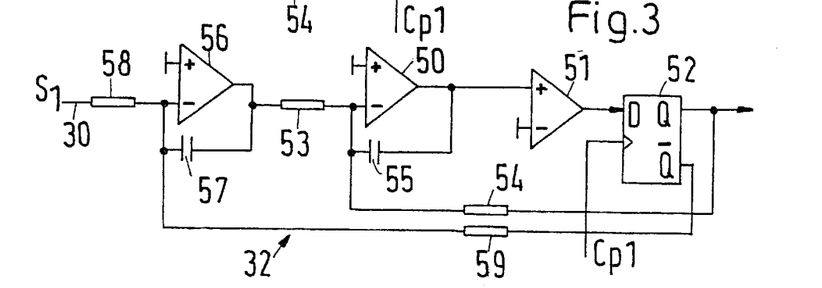

FIG. 3 illustrates a further embodiment of the sigma-to-delta converter 32 illustrated in FIG. 1, which differs from that shown in FIG. 2 merely in that an additional Miller integrator in the form of an operational amplifier 56 with a feedback capacitor 57 and an input resistance 58 is connected upstream of the input resistance 53 and the inverting output $\overline{Q}$ is connected to the inverting input of the operational amplifier 56 by way of an ohmic resistance 59. The sigma-to-delta converter 32 according to FIG. 3 is a second-order sigma-to-delta converter, in which double integration is effected and which consequently compensates even better for any interference signals and digitization noise. The two Miller integrators can have different integration constants. For the rest, the sigma-to-delta converter 32 according to FIG. 3 has the same function as the sigma-to-delta converter 32 according to FIG. 2.

The sigma-to-delta converter 33 according to FIG. 1 can be of the same construction as the sigma-to-delta converter 32 according to FIG. 2 or FIG. 3.

Figure 4:
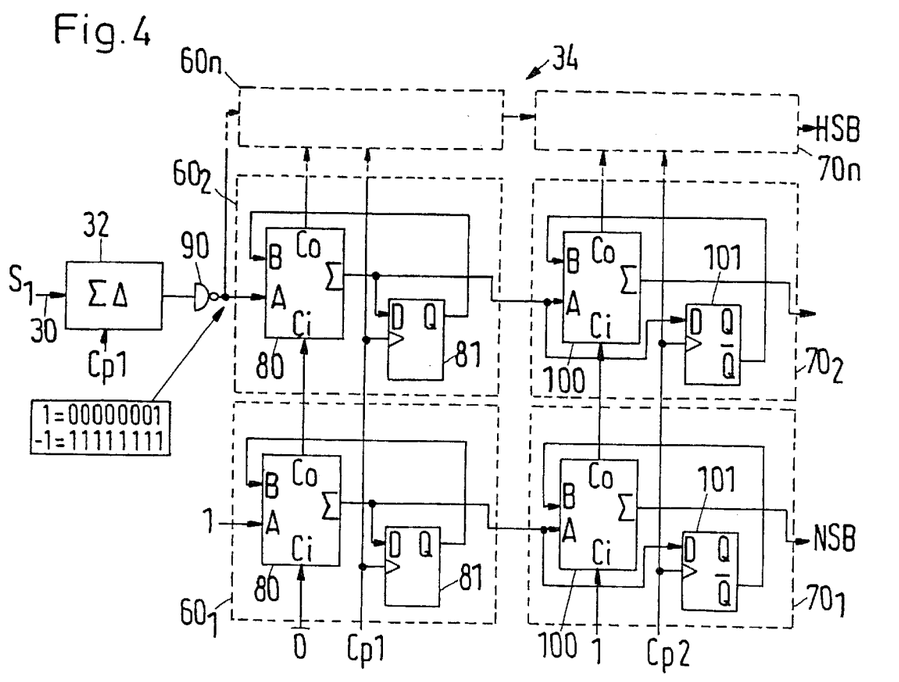
FIG. 4 is a simplified block circuit diagram of a Hogenauer decimator.

FIG. 4 illustrates a simple construction of the decimator 34 according to FIG. 1 connected downstream of the sigma-to-delta converter 32. It is a so-called Hogenauer decimator. In each of n rows of a first matrix of m columns and n rows, where m=1, it contains a digital integrator $60_1$, $60_2$, ... $60_n$, downstream of which there is connected a respective differentiating element $70_1$, $70_2$, ... $70_n$ in a second matrix of m columns and n rows, where also m=1. The number n corresponds on the other hand to the number of bit positions of the parallel bit patterns or bit combinations, which correspond to a sampling value of the sigma-to-delta converter 32 and 33 respectively, appearing at the output of the decimator. In FIG. 4 the first (lowermost) row is allocated to the least significant bit (LSB) and the $n^{th}$ (topmost) row is allocated to the most significant bit (MSB).

Each integrator $60_1$ to $60_n$ contains an adder 80 having two summing inputs A and B, a summation output Σ, a carry input Ci and a carry output Co and also a flip-flop 81, in this case a D-type flip-flop. In each integrator $60_1$ to $60_n$ the summation output Σ of the adder 80 is connected to the data input D of the flip-flop 81, and the output Q of the flip-flop 81 is connected to the summing input B. The summing input A of the adder 80 of the lowest bit position is allocated a binary 1 and its carry input Ci is allocated a binary 0. The carry outputs Co are each connected to the carry input Ci of the adder 80 for the next-higher bit position. The summing inputs A of the adders 80 of the integrators $60_2$ to $60_n$ are, however, connected jointly by way of a NOT-element 90 to the output of sigma-to-delta converter 32. The clock pulses Cp1 supplied to the clock inputs of the flip-flops 81 are the same as those supplied to the sigma-to-delta converter 32.

The differentiating elements $70_1$ to $70_n$ likewise each contain an adder 100 and a flip-flop 101 in the form of a D-type flip-flop. The summing inputs A of all adders 100 are each connected to the summation output Σ of the adders 80 of the same row and to the data input D of the flip-flop 101 of the same differentiating element $70_1$ to $70_n$. Conversely, the inverse outputs $\overline{Q}$ of the flip-flops 101 are connected to the summing input B of the adder 100 of the same differentiating element. The carry input Ci of the adder 100 of the differentiating element $70_1$ of the lowest bit position is allocated a binary 1, whilst the carry outputs Co of all adders 100 are connected to the carry input Ci of the adder 100 of the next-higher binary position. The summation outputs $\Sigma$ of the adders 100 simultaneously form the outputs of the decimator 34. On the other hand, clock pulses Cp2 of a very much lower pulse frequency than that of the clock pulses Cp1 are supplied to the clock inputs of all flip-flops 101. In the illustrated embodiment the clock pulses Cp2 have a frequency of 125 kHz.

The decimator shown in FIG. 4 operates so that the bits of the serial bit sequence from the output of the sigma-to-delta converter 32 are inverted by the NOT-element 90 and supplied to the inputs of all integrators $60_2$ to $60_n$ in parallel (simultaneously). Since the summing input A of the adder 80 of the lowest bit position is allocated a binary 1, and the summing inputs A of the remaining adders 80 are simultaneously supplied either with a binary 1 or a binary 0, this means, in the case of, for example, n=8 rows and accordingly eight adders 80, that only the two binary values "00000001" or "11111111" are supplied to the summing inputs A, "11111111" being the two's complement to "00000001". This means that each time a 0 appears at the output of the NOT-element 90, with a clock pulse Cp1 occurring simultaneously, a 1 (00000001) is added to the previous addition result and on the appearance of a 1 at the output of the NOT-element 90 its two's complement is added, that is, a 1 is subtracted.

Figure 5:
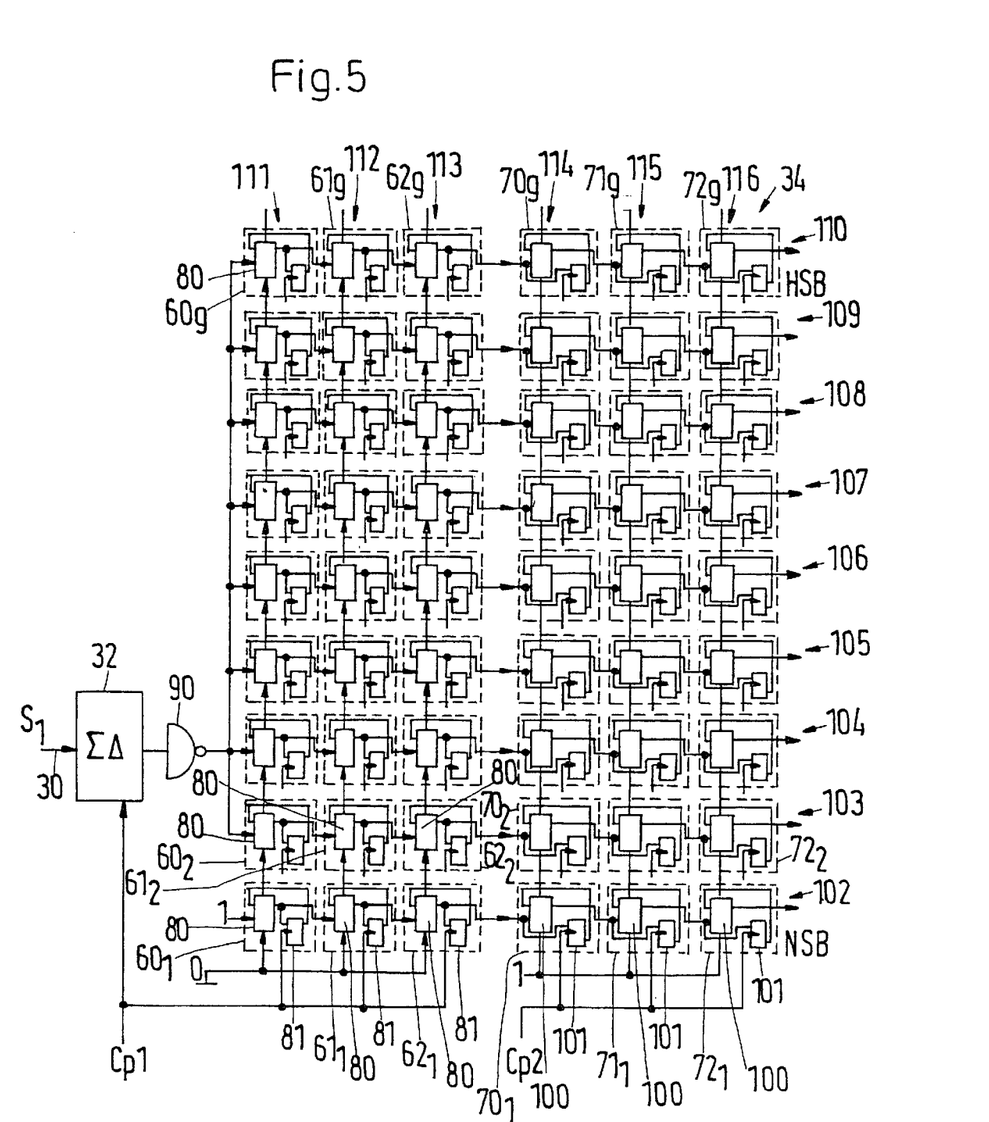
FIG. 5 is a more detailed block circuit diagram of a Hogenauer decimator.

FIG. 5 illustrates a further exemplary embodiment of the decimator 34 in the form of an expanded Hogenauer decimator, which comprises a first matrix of rows 102 to 109 and m=3 columns 111 to 113 and a matrix comprising n=9 rows 102 to 110 and m=3 columns 114 to 116.

In each column 111 to 113 the first matrix contains integrators $60_1$ to $60_9$, $61_1$ to $61_9$ and $62_1$ to $62_9$. The integrators $60_1$ to $62_9$ are all of the same construction as the integrators according to FIG. 1; in this case also the one summing input of the adder 80 of the integrator $60_1$ of the least-significant bit is allocated a binary 1 and the carry inputs of the adders 80 of all integrators $60_1$ to $62_1$ are allocated a binary 0. Furthermore, the one summing inputs of the adders 80 of the integrators $60_2$ to $60_9$ of the first column 111 are all connected in parallel to the output of the NOT-element 90, the summation outputs of all adders 80 of a column are connected to the one summing input of the adder 80 of the next column and the same row, and the carry outputs of all adders 80 of a row are connected to the carry inputs of the adders 80 of the next row and the same column. All clock inputs of the flip-flops 81 are supplied with clock pulses Cp1 of the relatively high frequency of 1 MHz.

In each column 114 to 116 the second matrix contains a differentiating element $70_1$ to $70_9$, $71_1$ to $71_9$, $72_1$ to $72_9$, all of which are of the same construction as the differentiating elements according to FIG. 4. Here too, the carry inputs of all adders 100 of the lowest binary position in the row 102 are allocated a binary 1 and each of the summation outputs of the adders 100 of the two columns 114 and 115 are connected to the one summing input of the adders 100 of the next column and the same row, whilst the inverse outputs of the flip-flops 101 of a respective column are connected to the other summing input of the adders 100 of the same column and row, and the summation outputs of the adders 100 of the last column form the outputs of the decimator 34. The carry outputs of the adders 100 of a row are connected to a respective one of the carry inputs of the next row and the same column, and the one summing inputs of the adders 100 in the column 114 are connected to a respective summation output of the adders 80 in the last column 113 of the first matrix. The clock pulses Cp2 of the relatively low frequency of 125 kHz are supplied to the clock inputs of all flip-flops 101.

The mode of operation of the decimator 34 according to FIG. 5 is fundamentally the same as that of the decimator 34 according to FIG. 4, except that in each row 102 to 110 of the first matrix three digital integrators are connected in series, and in each row 102 to 110 of the second matrix three digital differentiating elements are connected in series, so that in the first matrix a triple integration takes place and in the second matrix a triple differentiation takes place, and in this manner interference signals and the digitization noise of the sigma-to-delta converter 32 are even further reduced.

Here too, the second decimator 35 in FIG. 2 can also be of the same construction as the decimator 34 according to FIG. 4.

The signals I and R are not locked in phase with the sensor signals, but could be so locked in phase. Furthermore, they can have a frequency that is fixed, but it can also be variable in steps.

Although the filtering arrangement F in the exemplary embodiment illustrated contains low-pass filters 42 to 45, it may also contain band pass filters instead of the low-pass filters, the pass frequency range being matched also in this case to the difference frequency $\Delta\omega$.

What is claimed is:

1. Circuit arrangement for deriving a measured variable from signals of at least two sensors of a flow meter, which flow meter comprises at least one fluid line and means for exciting oscillations of a predetermined fundamental frequency in the fluid line, the sensors detecting the oscillations and the sensor signals being supplied in parallel by way of a respective A-D converter for each signal to a digital processing unit having a computation circuit in which a phase difference of the sensor signals is determined as a measure of the flow, the digital processing unit comprising a digital multiplier circuit and a digital filter arrangement downstream thereof, the digital multiplier circuit having means to multiply a digital sensor signal from each A-D converter with each one of at least two digital signals, the two digital signals being phase-displaced by 90° with respect to each other and representing sinusoidal oscillations of identical amplitude and of a frequency that varies by a difference frequency from the fundamental frequency, and the digital filter arrangement having a pass band that is matched to the difference frequency.

2. Circuit arrangement according to claim 1, in which the filter arrangement comprises a plurality of low-pass filters which are connected downstream of a respective multiplying element of the multiplier circuit.

3. Circuit arrangement according to claim 1, in which each A-D converter comprises a sigma-to-delta converter and a decimator connected downstream thereof.

4. Circuit arrangement for deriving a measured variable from signals of at least two sensors of a flow meter, which flow meter comprises at least one fluid line and means for exciting oscillations of a predetermined fundamental frequency in the fluid line, the sensors detecting the oscillations and the sensor signals being supplied in parallel by way of a respective A-D converter for each signal to a digital processing unit having a computation circuit in which a phase difference of the sensor signals is determined as a measure of the flow, the digital processing unit comprising a digital multiplier circuit and a digital filter arrangement downstream thereof, the digital multiplier circuit having means to multiply a digital sensor signal from each A-D converter with each one of at least two digital signals, the two digital signals being phase-displaced by 90° with respect to each other and representing sinusoidal oscillations of identical amplitude and of a frequency that varies by a difference frequency from the fundamental frequency, the digital filter arrangement having a pass band that is matched to the difference frequency, each A-D converter comprising a sigma-to-delta converter and a decimator connected downstream thereof, the decimator comprising a Hogenauer circuit having a first matrix of digital integrators followed by a corresponding second matrix of digital differentiating elements.

5. Circuit arrangement according to claim 4, in which the first matrix consists of m columns and n rows of integrators, each of which comprises an adder having a first and a second summing input, a carry input, a summation output and a carry output, the summation outputs being connected in each case to the first summing input of a following adder of the same row and the carry outputs of the adders of the same columns being connected in each case to the carry input of the adder of the next-higher bit position, and each integrator comprising a flip-flop having a data input and at least one output, the signal being transferred from the data input to the output of the flip-flop when a clock pulse at a clock input of the flip-flop changes value, and the summation output of the adder of the relevant integrator being connected to the data input of the flip-flop and the output of the flip-flop being connected to the second summing input of the adder of the same integrator.

6. Circuit arrangement according to claim 4, in which the second matrix consists of m columns and n rows of differentiating elements, each of which comprises an adder having two summing inputs, a carry input, a summation output and a carry output, the summation outputs in each case being connected to a first summing input of a following adder of the same row and the carry outputs of the adders of the same columns being connected in each case to the carry input of the adder of the next-higher bit position, and each differentiating element comprising a flip-flop having a data input and at least one output, the signal being transferred inverted from the data input to the output of the flip-flop when a clock pulse at a clock input of the flip-flop changes value, the data input of the flip-flop being connected to the first summing input of the adder of the relevant differentiating element and the output of the flip-flop being connected to the second summing input of the adder of the same differentiating element.

7. Circuit arrangement according to one of claim 5, in which, in the first column of the first matrix, the first summing inputs of the adders, except for the adder of the lowest order bit position, is connected to a common input for a serial bit sequence.

8. Circuit arrangement according to claim 5, in which parallel bit patterns for +1 and −1 are entered in the inputs of the decimators in dependence on the instantaneous value for the serial bit sequence, −1 being entered as the two's complement to 1.

9. Circuit arrangement according to claim 5, in which the first input of the lowest placed adder is allocated a binary 1.

10. Circuit arrangement according to claim 5, in which in the lowest placed row of the first matrix, the carry inputs of the adders are allocated a binary 0.

11. Circuit arrangement according to claim 6, in which in the lowest placed row of the second matrix, the carry inputs of the adders are allocated a binary 1.

12. Circuit arrangement according to claim 5, in which the first matrix operates at a high clock rate and the second matrix operates at a lower clock rate.

13. Circuit arrangement according to claim 4, in which the second matrix is in the form of a microprocessor.

14. Circuit arrangement according to claim 13, in which the parameters of the filter arrangement are variable in dependence on the application of the flow meter.

15. Circuit arrangement according to claim 6, in which the first input of the lowest placed adder is allocated a binary 1.

16. Circuit arrangement according to claim 6, in which in the lowest placed row of the first matrix, the carry inputs of the adders are allocated a binary 0.

17. Circuit arrangement according to claim 6, in which the first matrix operates at a high clock rate and the second matrix operates at a lower clock rate.

18. Circuit arrangement for deriving a measured variable from signals of at least two sensors of a flow meter, which flow meter comprises at least one fluid line and means for exciting oscillations of a predetermined fundamental frequency in the fluid line, the sensors detecting the oscillations and the sensor signals being supplied in parallel by way of a respective A-D converter for each signal to a digital processing unit having a computation circuit in which a phase difference of the sensor signals is determined as a measure of the flow, the digital processing unit comprising a digital multiplier circuit and a digital filter arrangement downstream thereof, the digital multiplier circuit having means to multiply a digital sensor signal from each A-D converter with each one of at least two digital signals, the two digital signals being phase-displaced by 90° with respect to each other and representing sinusoidal oscillations of identical amplitude and of a frequency that varies by a difference frequency from the fundamental frequency, the digital filter arrangement having a pass band that is matched to the difference frequency, and in which the computation circuit determines the phase difference of the sensor signals according to the relation $$\varphi = \arctan\frac{bc - ad}{ac + bd}$$

in which a and b are the output signals of the filter arrangement after multiplication of the one sensor signal and c and d are the output signals of the filter arrangement after multiplication of the other sensor signal.

19. Circuit arrangement for deriving a measured variable from signals of at least two sensors of a flow meter, which flow meter comprises at least one fluid line and means for exciting oscillations of a predetermined fundamental frequency in the fluid lines the sensors detecting the oscillations and the sensor signals being supplied in parallel by way of a respective A-D converter for each signal to a digital processing unit having a computation circuit in which a phase difference of the sensor signals is determined as a measure of the flow, the respective A-D converters sampling the sensor signals at a clock rate which is fixed and unsynchronized with the sensor frequency, the digital processing unit comprising a digital multiplier circuit and a digital filter arrangement downstream thereof, the digital multiplier circuit having means to multiply a digital sensor signal from each A-D converter with each one of at least two digital signals, the two digital signals being phase-displaced by 90° with respect to each other and representing sinusoidal oscillations of identical amplitude and of a frequency that may vary by a difference frequency from the sensor frequency, and the digital filter arrangement having a pass band that is matched to the difference frequency.

* * * * *